(12) United States Patent
Hjorteset

(10) Patent No.: US 11,482,745 B2
(45) Date of Patent: Oct. 25, 2022

(54) MARINE ENERGY STORAGE UNIT AND A METHOD TO PREVENT THERMAL RUNAWAY IN A MARINE ENERGY STORAGE UNIT

(71) Applicant: ROLLS-ROYCE MARINE AS, Alesund (NO)

(72) Inventor: Jens Hjorteset, Bjoeroehamn (NO)

(73) Assignee: KONGSBERG MARITIME AS, Horten (NO)

( * ) Notice: Subject to any disclaimer, the term of this patent is extended or adjusted under 35 U.S.C. 154(b) by 592 days.

(21) Appl. No.: 16/278,870

(22) Filed: Feb. 19, 2019

(65) Prior Publication Data
US 2020/0266508 A1      Aug. 20, 2020

(30) Foreign Application Priority Data

Feb. 18, 2019   (NO) .................................. 20180252

(51) Int. Cl.
| | |
|---|---|
| *H01M 10/663* | (2014.01) |
| *H01M 10/613* | (2014.01) |
| *H01M 10/625* | (2014.01) |
| *B63J 2/02* | (2006.01) |
| *H01M 50/20* | (2021.01) |
| *H01M 50/30* | (2021.01) |

(52) U.S. Cl.
CPC ............. *H01M 10/663* (2015.04); *B63J 2/02* (2013.01); *H01M 10/613* (2015.04); *H01M 10/625* (2015.04); *H01M 50/20* (2021.01); *H01M 50/30* (2021.01); *H01M 2220/20* (2013.01)

(58) Field of Classification Search
CPC ....... H01M 50/30–392; H01M 50/572; H01M 10/65; H01M 10/6561; H01M 2200/00; H01M 2200/10
See application file for complete search history.

(56) References Cited

U.S. PATENT DOCUMENTS

| | | | |
|---|---|---|---|
| 2005/0170238 A1* | 8/2005 | Abu-Isa | H01M 50/342 429/82 |
| 2013/0017421 A1* | 1/2013 | Onnerud | H01M 50/572 429/61 |
| 2014/0023887 A1* | 1/2014 | Lim | H01M 50/26 429/50 |
| 2015/0101355 A1 | 4/2015 | Oh | |
| 2017/0015397 A1* | 1/2017 | Mitchell | H01M 10/6568 |

FOREIGN PATENT DOCUMENTS

KR             101614688 B1     4/2016

OTHER PUBLICATIONS

Norwegian Search Report dated Sep. 24, 2018 for corresponding Norwegian patent application No. 20180252.

* cited by examiner

*Primary Examiner* — Stephan J Essex
(74) *Attorney, Agent, or Firm* — Abelman, Frayne & Schwab

(57) ABSTRACT

Marine energy storage unit with thermal runaway safety barriers to prevent cell temperature increase, said marine energy storage unit comprises at least one closed module cabinet (10) with a plurality of stacked battery cells (4) and an internal cooling system. The internal cooling system comprises an enclosed cabinet cooling circuit (3) with a water-to-air exchanger (20) for air cooling of the battery cells (4), and the water-to-air exchanger (20) is connected to a water-to-water heat exchanger (30) for receipt of water from an external source.

7 Claims, 2 Drawing Sheets

MARINE ENERGY STORAGE UNIT AND A METHOD TO PREVENT THERMAL RUNAWAY IN A MARINE ENERGY STORAGE UNIT

CROSS REFERENCE TO RELATED APPLICATIONS

This application claims priority to NO patent application No. 20180252, filed Feb. 19, 2018, all of which are incorporated herein by reference thereto.

FIELD OF THE INVENTION

The present invention relates to a marine energy storage unit with thermal runaway safety barriers to prevent cell temperature increase, and a method to prevent thermal runaway in a marine energy storage unit.

BACKGROUND OF THE INVENTION

Energy storage systems with for instance lithium-ion battery cells are used in many applications, such as electric ferries, hybrid offshore vessels, hybrid drilling rigs, cranes and other applications with high current requirements.

In recent years many ship designers have started to replace conventional diesel- or gas engines with battery packs, or the diesel- or gas engines work together with battery packs.

Thermal runaway can be a problem in such energy storage systems. Thermal runaway occurs in situations where an increase in temperature changes the conditions in a way that causes a further increase in temperature, often leading to a destructive result.

In electrical engineering, thermal runaway is typically associated with increased current flow and power dissipation, although exothermic chemical reactions can be of concern here too.

Some electronic components develop lower resistances or lower triggering voltages (for nonlinear resistances) as their internal temperature increases. If circuit conditions cause markedly increased current flow in these situations, increased power dissipation may raise the temperature further by Joule heating. A vicious circle or positive feedback effect of thermal runaway can cause failure, sometimes in a spectacular fashion (e.g. electrical explosion or fire). To prevent these hazards, well-designed electronic systems typically incorporate current limiting protection, such as thermal fuses, circuit breakers, or PTC current limiters.

To handle larger currents, circuit designers may connect multiple lower-capacity devices (e.g. transistors, diodes, or MOVs) in parallel. This technique can work well, but is susceptible to a phenomenon called current hogging, in which the current is not shared equally across all devices. Typically, one device may have a slightly lower resistance, and thus draws more current, heating it more than its sibling devices, causing its resistance to drop further. The electrical load ends up funneling into a single device, which then rapidly fails. Thus, an array of devices may end up no more robust than its weakest component.

The current-hogging effect can be reduced by carefully matching the characteristics of each paralleled device, or by using other design techniques to balance the electrical load. However, maintaining load balance under extreme conditions may not be straightforward. Devices with an intrinsic positive temperature coefficient (PTC) of electrical resistance are less prone to current hogging, but thermal runaway can still occur because of poor heat sinking or other problems.

Many electronic circuits contain special provisions to prevent thermal runaway. This is most often seen in transistor biasing arrangements for high-power output stages. However, when equipment is used above its designed ambient temperature, thermal runaway can still occur in some cases. This occasionally causes equipment failures in hot environments, or when air cooling vents are blocked.

Thermal runaway in marine energy storage systems occurs mainly due to heavy load cycles, which increases internal temperature in the stacks of lithium-ion battery cells. Thermal runaway can also occur due to cell production failure, internal or external electrical failures or external heat sources.

Such energy storage systems can be housed in an IP cabinet or enclosure. The International (or Ingress) Protection IP rating system defines an enclosure's protective capacity, and then assigns an IP Code. The code labels an enclosure's IP followed by two numbers; the first digit shows the extent to which equipment is protected against particles, and the second digit indicates the extent of protection against water. For instance IP54 enclosures have a high level of protection against particles, and a fair amount of protection against water.

Disclosure of the State of Art

Low-cost battery modules available today are designed for use in bulk energy land applications. These systems require the use of fire suppression systems, they have no failure containment (i.e. vent gases to room), and the packaging typically does not comply with marine requirements.

A disadvantages with the known systems can be that the rack releases energy to the battery room from the full module, and they therefore require fire suppression systems.

It is also known marine energy storage systems that are designed as a modular, stackable and configurable energy storage building block. Each module is comprised of several lithium-ion battery cells. The cells can be encased in a metal housing for protection, cooling and safety. These modules are connected in series to achieve bus voltage and parallel strings are added together to meet the total required system capacity. Water cooling is used directly on the battery cells.

Such modules can be housed in racking systems and in containers. The rack construction provides mechanical protection, integrated cooling and an external venting system.

US 2015/0101355 A1 discloses an air conditioning system and method for a high-voltage battery of a vehicle. The system includes a first heat exchanger that is disposed within a battery housing and a first blower that supplies air to the first heat exchanger. A peltier element is combined with the first heat exchanger and a first surface of the peltier element comes into contact with the first heat exchanger. A second heat exchanger is disposed in an air extraction unit of a trunk room and a second blower supplies air to the second heat exchanger, to discharge air inside the trunk room to an exterior after performing heat exchange. A cooling line operates as a coolant circulating line, and a first end of the cooling line comes into contact with a second surface of the peltier element and a second end performs heat exchange between the second end and the second heat exchanger.

KR 101614688 B discloses a battery pack for airtight electric ships. The battery pack comprises: a battery pack case including an upper case and a lower case; an air layer/cooling water layer forming part including an upper air layer/cooling water layer forming part and a lower air layer/cooling water layer forming part; and a flexible closed end including a first flexible closed end and a second flexible closed end. By having an airtight structure, the battery pack can achieve conditions required as the battery pack for electric ships, including vibration, impact, waterproofness, dustproofness, and thermal radiation.

Objects of the Present Invention

On marine vessels, in particular electric and hybrid vessels, there is thus a need for energy storage unit or enclosure on a marine platform, in where the mentioned disadvantages can be avoided.

The invention will enable mass production of battery modules in the marine segment to reduce financial risk, price, increase quality and enable more marine battery installations, hence reducing global emissions.

The invention also provides increased safety due to multiple safety barriers, gives simpler vessel integration, and "battery room" in a box. It can also cover the ageing aspect in propagation control.

With the invention it is possible to use low-cost land modules in a sealed cabinet that will allow any fire suppression system to be used, and confine a module thermal event to a small defined space. It is expected that the invention can provide a low-cost energy storage solution that offers substantial reduction in the installed price compared to today's market prices.

A further object is application of fresh water or sea water for use in the cooling systems.

It is also an object to provide a system and a method with several thermal runaway safety barriers to prevent cell temperature increase.

SUMMARY OF THE INVENTION

The above objects are achieved with a marine energy storage unit with thermal runaway safety barriers to prevent cell temperature increase, said marine energy storage unit comprises at least one closed module cabinet with a plurality of stacked battery cells and an internal cooling system, wherein the internal cooling system comprises an enclosed cabinet cooling circuit with a water-to-air exchanger for air cooling of the battery cells, and the water-to-air exchanger is connected to a water-to-water heat exchanger for receipt of water from an external source.

The enclosed cabinet cooling circuit is preferably a first safety barrier arranged to prevent cell temperature increase.

The module cabinet can comprise an additional safety barrier with a cooling medium unit, said cooling medium unit being arranged to release cooling medium in the cabinet cooling circuit in case of temperature increase.

The module cabinet can comprise an additional safety barrier with an gas unit, said gas unit being arranged to release gas in the cabinet cooling circuit in case of temperature increase.

The module cabinet can comprise additional safety barriers based on oxygen removal or cooling mediums, said additional safety barriers being arranged to release gas or cooling medium in the cabinet cooling circuit in case of detection of gas, such as hydrogen.

The cooling medium units and the gas units can be connected to one or more temperature sensors in the module cabinet.

The cooling medium units and the additional safety barrier units can be housed in separate sections in the closed module cabinet or externally as separated units The module cabinet can also comprise an additional safety barrier, said additional barrier being an extraction fan arranged to start if a lower explosion limit is reached.

The module cabinet can further comprise an additional safety barrier, said additional barrier being a water mist system arranged to be released in case of thermal runaway.

The water-to-water heat exchanger is preferable connected to a circulation pump circulating water, wherein the water is temperature regulated in the water-to-water heat exchanger.

The water-to-air exchanger can comprise a fan directing cooling air to the battery cells.

The stacked battery cells can be lithium-ion batteries.

Several module cabinets can be connected in series forming a string.

The above objects are also achieved with a method to prevent thermal runaway in a marine energy storage unit, said marine energy storage unit comprises at least one closed module cabinet with a plurality of stacked battery cells and an internal cooling system, wherein the method comprises the steps:
 regulation of water temperature in water supplied to a water-to-air exchanger in an enclosed cooling circuit in the cabinet, and
 directing air directly to the battery cells, wherein the air is cooled in the water-to-air exchanger.

For regulation of water temperature in water supplied to the water-to-air exchanger, the water-to-air exchanger can be connected to a water-to-water heat exchanger receiving water from an external source.

The method may further comprises the steps: in case the previous safety barrier fails and cell or cabinet temperature increases to thermal runaway, releasing a cooling medium in the cabinet cooling circuit.

The method may further comprises the steps: in case the previous safety barriers fail and cell or cabinet temperature continues into thermal runaway, releasing a gas medium in the cabinet cooling circuit.

The method may further comprises the steps: in case the previous safety barriers fail and detection of gas and thermal runaway temperature, releasing a gas in the cabinet cooling circuit.

The method may further comprises the steps: in case the previous safety barriers fail and lower explosion limit is reached, disconnecting non ex-rated equipment and staring an extraction fan.

The method may further comprises the steps: in case the previous safety barriers fail and detection of thermal runaway, releasing a water mist into the cabinet preventing propagation of fire.

DESCRIPTION OF THE FIGURES

Embodiments of the present invention will now be described, by way of example only, with reference to the following figures, wherein.

DESCRIPTION OF PREFERRED EMBODIMENTS OF THE INVENTION

Figure 1:
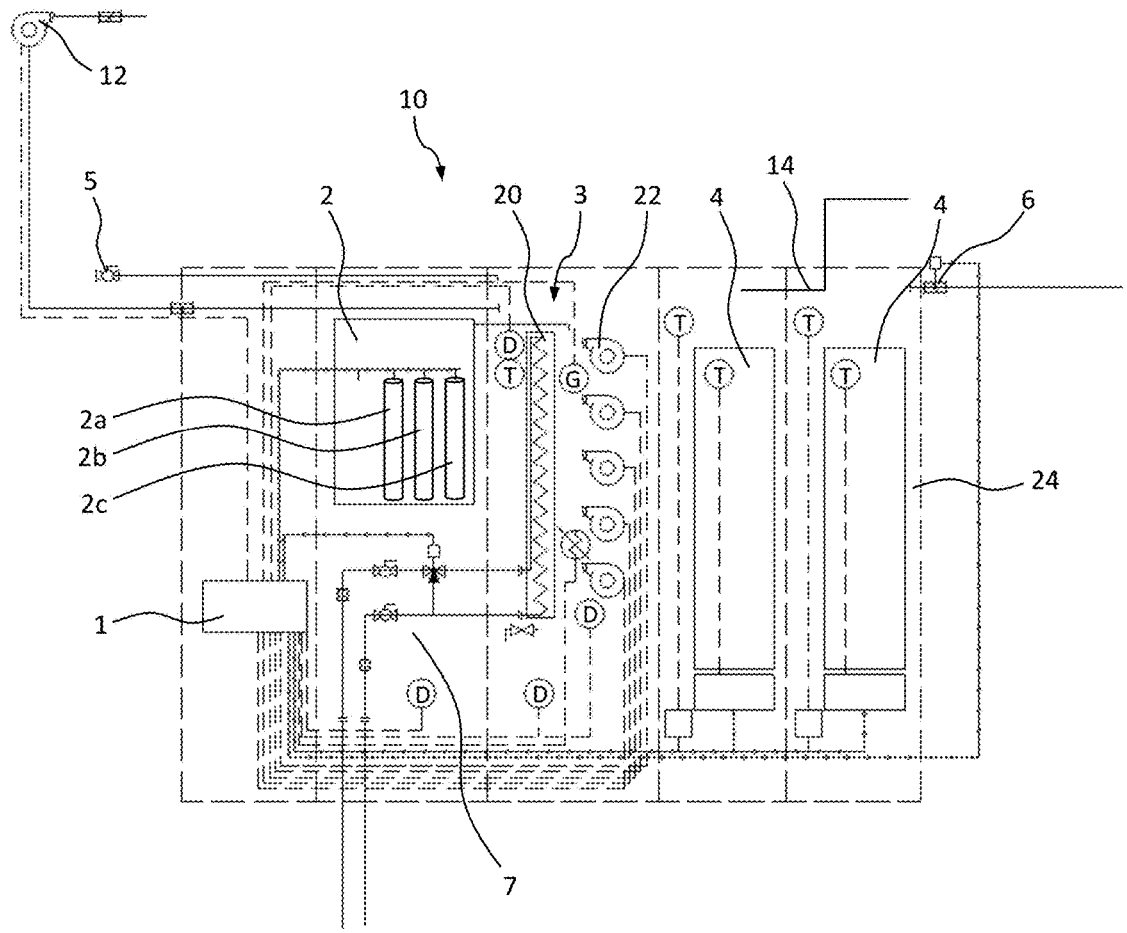
FIG. 1 shows a first embodiment of a modular cabinet according to the invention.
Figure 2:
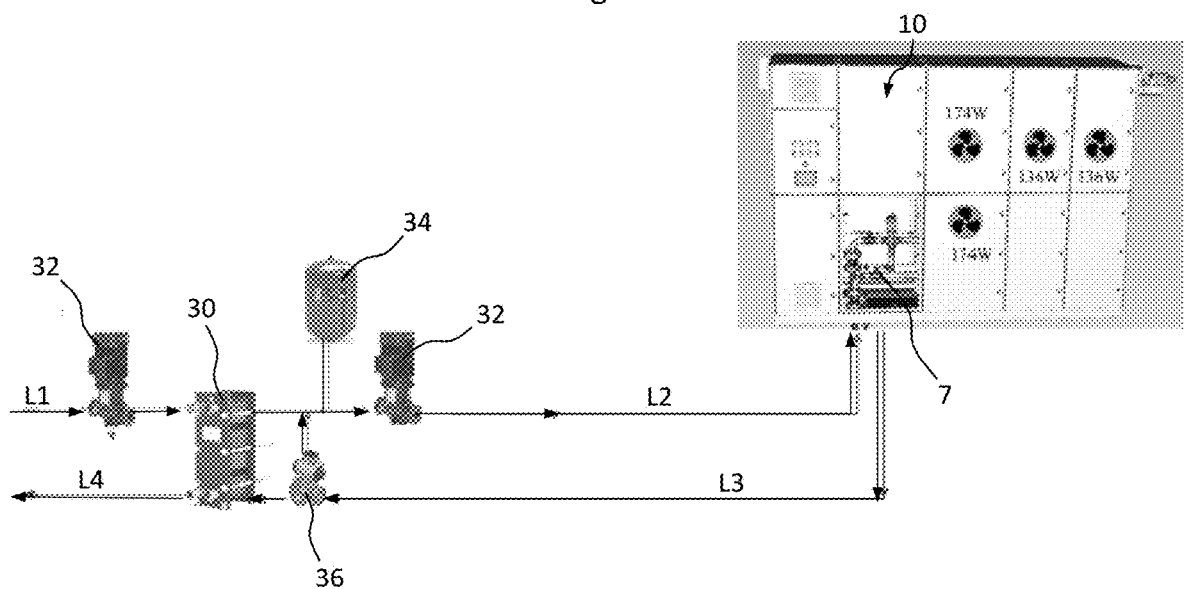
FIG. 2 shows the modular cabinet connected to an external cooling system.
Figure 4:
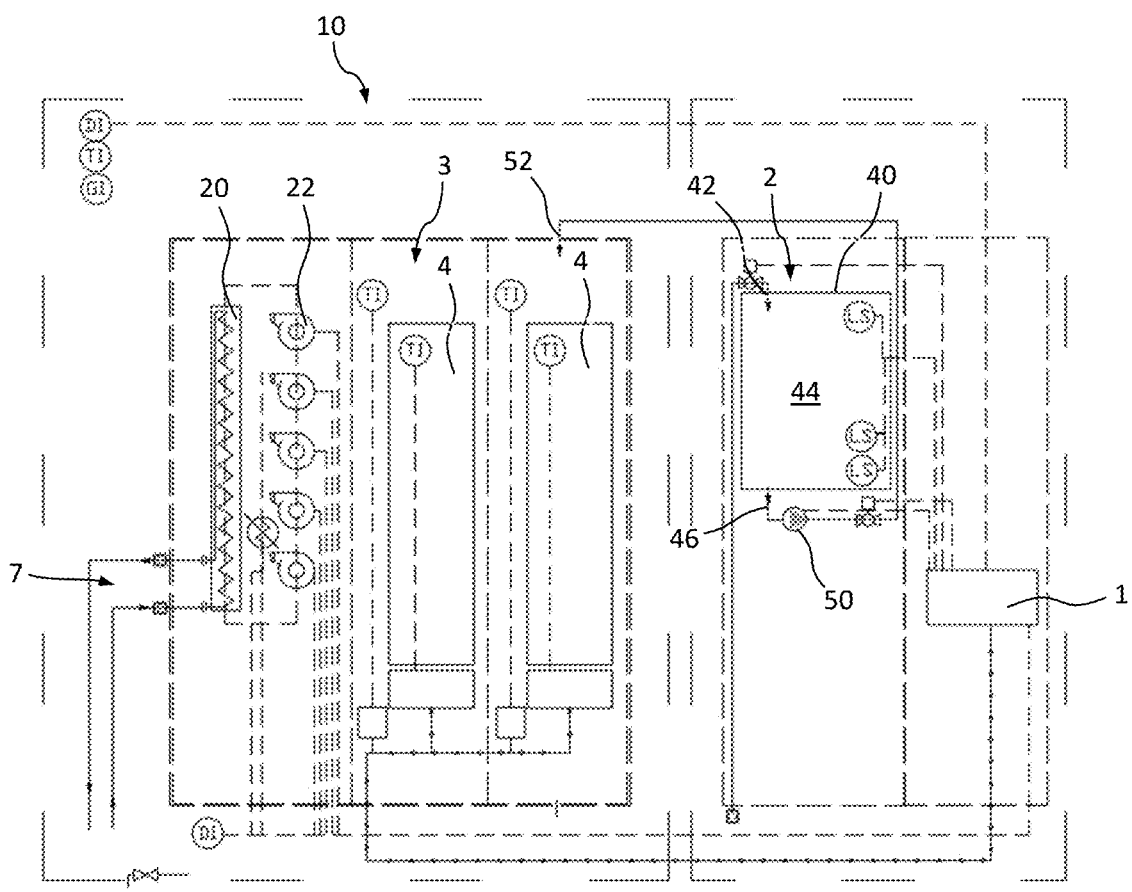
FIG. 4 shows a second embodiment of a modular cabinet according to the invention.

A marine energy storage unit according to the invention may comprise several modular cabinets 10 as shown in FIGS. 1, 2 and 4. The modular cabinets 10 can be connected in series forming a string. Each string may have an independent electrical connection to the DC-link.

The invention will however in the following be described in relation to a marine energy storing unit with one modular cabinet 10. Reference number 10 is given to the embodiment shown in both FIGS. 1 and 4.

The modular cabinet 10 has as main features: a control section 1, a fire suppression section 2, an internal cooling circuit 3, a string section with stacked battery cells 4, a thermal runaway piping interface 5, an inlet air valve 6 and a water cooling interface 7. The battery cells 4 are preferable lithium-ion batteries.

The lithium-ion battery cells 4 can be stacked in the module cabinet 10 with for instance two cells in parallel and the rest in series.

The marine energy storage unit is thus a module based cabinet design. Each modular cabinet 10 comprises control, fire suppression, cooling and several string sections. The modular cabinet 10 is designed to be IP isolated from the room environment. The cabinet may have an IP 54 enclosure, or other IP enclosures dependent on requirements, and will not need to use air from the room to cool the battery cells 4. The external cooling interface is preferable freshwater or sea water. The cabinet 10 is connected to an external water-to-water exchanger 30, and the cabinet 10 has an internal heat exchanger 20 with water-to-air conversion and an internal ducting system 24. The external water-to-water exchanger 30 and the internal heat exchanger 20 are interconnected in the water cooling interface 7.

In addition, the cabinet 10 has an internal fire suppression system to prevent explosion, fire and battery module propagation in case of a thermal runaway event in a battery module 4. The interfaces required for the cabinet design is external cooling water, received from the water-to-water exchanger 30 at for instance 6-17° C., gas extraction ventilation, electrical DC main power, auxiliary power supply and control interface 1.

Each modular cabinet 10 in the marine energy storage unit can have several thermal runaway safety barriers to prevent battery cell temperature increase. A possible first safety barrier is the cabinet cooling design, which is based on the internal and enclosed cooling circuit 3. Hence, cooling of the room environment may not be required. The internal cooling circuit 3 will keep the battery cells 4 in the cabinet string module at for instance 23° C.+/−5° C. if the ambient air temperature is maximum 45° C. and the cooling water is for instance 6-17° C.

Figure 3:
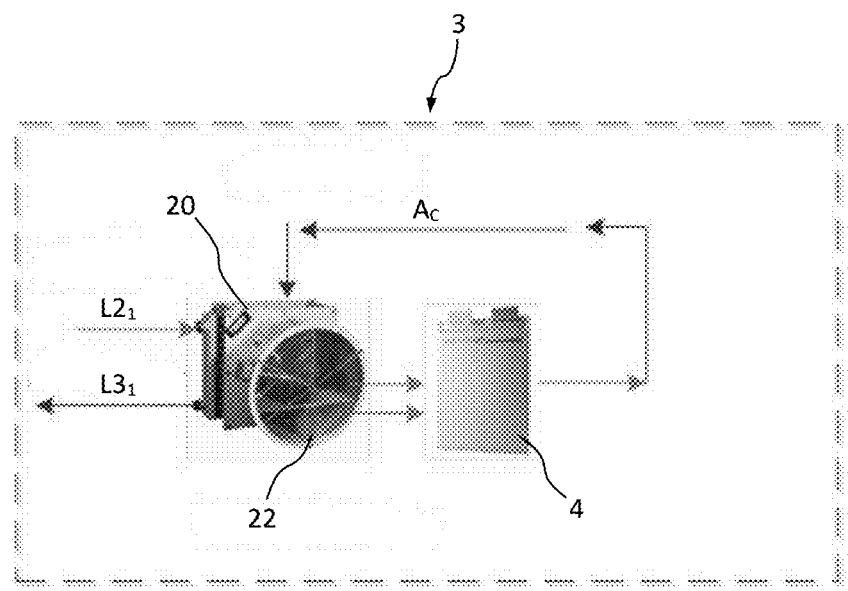
FIG. 3 shows an internal cooling system of the modular cabinet.

The internal cooling circuit 3 is shown in more detail in FIGS. 1, 3 and 4, and comprises the water-to-air exchanger 20 receiving water via the water interface 7 in a line $L2_1$. Used water from the water-to-air exchanger 20 exits via a line $L3_1$ to the water interface 7. Air Ac passing the water-to-air exchanger 20 is cooled and is directed to pass the battery cells 4 by one or more fans 22, as shown by the arrows in FIG. 3.

In order to supply water of optimal temperature to the water-to-air exchanger 20 in the cabinet 10, the external water-to-water heat exchanger 30 is connected to the water interface 7. The external water-to-water heat exchanger 30 receives water from an external source, such as sea or fresh water, via a line L1, to the water-to-water heat exchanger 30, and further to the water interface 7 of the cabinet 10. The external water may have a temperature of for instance 0-32° C., but the water to the water-to-air exchanger 20 in the cooling circuit 3 can be maintained at for instance a temperature range of 6-17° C., after being cooled, or heated, in the water-to-water heat exchanger 30.

FIG. 2 shows the external water supply system connected to the cabinet 10. The water can be pumped using one or two circulation pumps 32. A pressure tank 34 and valve 36 may also be incorporated in the system. Water from the water-to-air exchanger 20 exits the water interface 7 via a line L3 to the valve and can flow to the line L2 via the valve 36 or to the water-to-water heat exchanger 30, in where it can be cooled again or released externally.

As mentioned, each modular cabinet 10 in the marine energy storage unit has several thermal runaway safety barriers. Some of the barriers are optional depending on the technology put into the energy storage unit. How many barriers that needs to be used and the activation sequence of the safety barriers is dependent on the battery cell and battery modules used/placed inside the energy storage unit.

For thermal detection can one or more temperature sensors T, T1 be mounted inside the battery module, and also in the air-inlet and outlet on the battery module or cabinet 10.

In case a first safety barrier fails and cell or cabinet temperature increases to thermal runaway, a cooling medium can be released in the cabinet cooling circuit 3. This is an additional and possible second safety barrier. Releasing cooling medium (for instance gas or water-mist) will reverse the thermal runaway so that no gas release or fire occur. In FIG. 1, cooling medium in the form of gas can be released from a cooling medium unit 2a in the fire suppression section 2. In FIG. 4, cooling medium in the form of water mist can be released from a cooling medium unit 40 in the fire suppression section 2. Alternatively the cooling medium can be released from an external cooling medium unit.

As an additional and possible third safety barrier, in case of cell or cabinet temperature continues into thermal runaway, additional gas or cooling medium can released and circulated in the cooling circuit 3. If thermal runaway cells ventilates there is no explosion and fire atmosphere due to the gas or cooling medium. In FIG. 1, the gas, for instance inert gas, or cooling medium can be supplied from the gas or cooling unit 2b located in the fire suppression section 2. In FIG. 4, the cooling medium in the form of water mist can be supplied from the cooling medium unit 40 located in the fire suppression section 2. Alternatively the gas and cooling medium can be released from an external cooling medium unit.

In case of undetected thermal runaway temperature, as an additional and possible fourth safety barrier, additional gas or cooling medium can be released based on gas detection (hydrogen) so that there is no explosion and fire atmosphere due to the fire suppression medium. The additional gas, for instance inert gas, or cooling medium can be released from a second gas or cooling unit 2c, alternatively the gas and cooling medium can be released from an external cooling medium unit, and gas detections sensors G, G1 can be installed in the cabinet 10, possibly within the closed cooling circuit 3.

To increase safety even more the cabinet 10 can be equipped with an additional and possible fifth safety barrier to prevent explosion. In case the previous barriers fails and lower explosion limit is reached, all non ex-rated equipment can be disconnected, hence removing ignition sources. An Ex-rated extraction fan 12 can be overridden and manually stared or start automatically. Gas is diluted to no explosive limits and transported to open air or safe location.

As an additional and possible sixth safety barrier the cabinet can include a water-mist system 14, which can be similar to or same as the water mist system disclosed in relation to FIG. 4. In case failure in multiple safety barriers a high fog water mist system can manually or automatically be released into the cabinet 10 preventing propagation in case of a thermal-runaway. The automatically arranged release can be based on temperature and or gas detection in the cabinet.

The cabinet 10 may also comprise leakage and/or humidity sensors D, D1. All sensors, i.e. temperature sensors T, T1, leakage/humidity sensors D, D1 and gas sensors G, G1, are connected to the control section 1.

FIG. 4 shows a second embodiment of a modular cabinet 10 according to the invention. The main difference between the embodiment in FIG. 1 and FIG. 4 is that the units 2a, 2b, 2c, which can be pressurized containers, have been omitted and replaced by a water mist system.

The fire suppression section 2 of the second embodiment shown in FIG. 4 comprises the cooling medium unit 40, in the form of the water mist system, connected to the control section 1. The cooling medium unit 40 comprises a water mist system having a water inlet 42 for supply of water to a container or tank 44. The tank 44 has several level switches LS.

The tank 44 further has a water outlet 46 connected to a pump 50, said pump being controlled by the control section 1. Upon activation of the pump 50, pressurized water is sent to one or more water mist outlet 52 for distribution of water mist in the air circulating in the cabinet cooling circuit 3. The water mist system will typically be activated in case of temperature increase, but may be activated based on other parameters, as mentioned previously.

The invention claimed is:

1. A marine energy storage unit with thermal runaway safety barriers to prevent cell temperature increase, said marine energy storage unit comprising:
   at least one closed module cabinet comprising
   a plurality of stacked lithium-ion battery cells,
   an internal cooling system, comprising a first safety barrier comprising an enclosed cabinet cooling circuit with a water-to-air exchanger for air cooling of the battery cells to prevent cell temperature increase, said water-to-air exchanger connected to a water-to-water heat exchanger for receipt of water from an external source,
   a second safety barrier with a cooling medium unit located in a fire suppression section, said cooling medium unit releasing cooling medium in the cabinet cooling circuit in response to cell or cabinet temperature increasing to thermal runaway, at a first temperature,
   a third safety barrier with a first gas unit located in the fire suppression section, said first gas unit releasing inert gas in the cabinet cooling circuit in response to cell or cabinet temperature continuing into thermal runaway, at a second temperature,
   and
   a fourth safety barrier with a second gas unit located in the fire suppression section, said second gas unit releasing inert gas in the cabinet cooling circuit in response to detection of gas and thermal runaway temperature at a third temperature, wherein the second temperature is greater than the first temperature and the third temperature is greater than the second temperature.

2. The marine energy storage unit according to claim 1, wherein the module cabinet comprises one or more temperature sensors connected to at least one cooling medium unit and/or at least one gas unit.

3. The marine energy storage unit according to claim 1, wherein the module cabinet comprises an fifth additional safety barrier, said barrier being an extraction fan starting if a lower explosion limit is reached.

4. The marine energy storage unit according to claim 1, wherein the module cabinet comprises an sixth additional safety barrier, said barrier being a water mist system being released in case of thermal runaway.

5. The marine energy storage unit according to claim 1, wherein the water-to-water heat exchanger is connected to a circulation pump circulating water, wherein the water received from the external source is temperature regulated in the water-to-water heat exchanger.

6. The marine energy storage unit according to claim 1, wherein the water-to-air exchanger comprises a fan directing cooling air to the battery cells.

7. The marine energy storage unit according to claim 1, wherein several module cabinets are connected in series forming a string.

* * * * *

UNITED STATES PATENT AND TRADEMARK OFFICE
CERTIFICATE OF CORRECTION

| | | |
|---|---|---|
| PATENT NO. | : 11,482,745 B2 | Page 1 of 1 |
| APPLICATION NO. | : 16/278870 | |
| DATED | : October 25, 2022 | |
| INVENTOR(S) | : Jens Hjorteset | |

It is certified that error appears in the above-identified patent and that said Letters Patent is hereby corrected as shown below:

On the Title Page

Item (30) Foreign Application Priority Data:
Please change Feb. 18, 2019 to -- Feb. 19, 2018 --

Signed and Sealed this
Sixth Day of August, 2024

Katherine Kelly Vidal
*Director of the United States Patent and Trademark Office*